United States Patent [19]

Kröger

[11] 4,058,183

[45] Nov. 15, 1977

[54] STRADDLE CARRIER

[75] Inventor: Keijo Kalevi Kröger, Tampere, Finland

[73] Assignee: Valmet Oy, Helsinki, Finland

[21] Appl. No.: 321,736

[22] Filed: Jan. 8, 1973

[30] Foreign Application Priority Data

Jan. 11, 1972 Finland .................................... 61/72

[51] Int. Cl.2 ............................................... B60K 35/00

[52] U.S. Cl. .................................... 180/89.1; 214/392; 280/106 R

[58] Field of Search ...................... 180/44 R, 45, 54 C, 180/89; 280/91, 106, 124 B; 214/394, 396, 390, 392

[56] References Cited

U.S. PATENT DOCUMENTS

| | | | |
|---|---|---|---|
| 1,654,107 | 12/1927 | Andren | 280/106 |
| 2,488,520 | 11/1949 | Beck | 180/45 |
| 2,931,681 | 4/1960 | Keller | 180/89 |
| 3,067,830 | 12/1962 | Lee | 180/45 |
| 3,197,229 | 7/1965 | Houlton | 280/91 |
| 3,698,581 | 10/1972 | Goyarts | 214/394 |
| 3,743,314 | 7/1973 | Archer | 280/124 B |
| 3,794,196 | 2/1974 | Terho et al. | 214/390 |

FOREIGN PATENT DOCUMENTS

| | | | |
|---|---|---|---|
| 2,002,080 | 8/1970 | Germany | 214/390 |

*Primary Examiner*—Robert J. Spar
*Assistant Examiner*—Ross Weaver
*Attorney, Agent, or Firm*—Allison C. Collard

[57] ABSTRACT

A straddle carrier, between the side bodies of which a space is formed for the loads to be transported, particularly characterized in that its body consists of two opposed upper side bodies, which have been mutually connected by a transversal beam at their middle, and the driver's cab being placed upon this beam. By this arrangement, unobstructed forward and rearward visibility from the driver's seat is gained, in contrast with the design of prior art incorporating one transversal beam at the front and another in the rear.

Further, optional characteristics specify that the transversal beam is of a box-type design and serves in the manner of a torsion spring to adapt the carrier to uneven driving surfaces; that the straddle carrier's power means (at least one engine) are placed below the upper side bodies, supported by separate lower side bodies; and that the upper surfaces of the upper side bodies are sloping for even more expanded visibility.

3 Claims, 4 Drawing Figures

STRADDLE CARRIER

The present invention concerns a straddle carrier between the side bodies of which a space is formed for the loads to be transported.

Straddle carriers are commonly known in prior art. The body of previously known straddle carriers consists of side bodies joined at both ends by transversal beams, and at each corner of the body there is a steering arm construction with an associated fork for each wheel. The engine of the straddle carrier, with its transmission gear, is located, in most constructions of prior art, upon the side bodies and substantially on a level with the driver's cab. The driver's cab, in its turn, has been placed at a great height from the driving surface between and above said side bodies and the transversal beams connecting them, with a consequence of poor vision from the driver's cab of the close surroundings of the straddle carrier, especially in its direction of travel, where said transversal beams and the engine with its transmission obstruct the vision. Therefore, among the accidents that have occurred with straddle trucks those instances have been most frequent in which a person has been run over, and which have expressly been due to the driver's limited field of vision, particularly in the direction of travel of the straddle carrier.

The aim of the present invention is to avoid the drawbacks pointed to in the foregoing and to achieve a simple straddle carrier construction wherein the driver's field of vision can be substantially expanded particularly in the direction of travel, both forward and rearward. The aims of the invention are achieved in a straddle carrier mainly characterized in that the body of the straddle carrier consists of two opposed so-called upper side bodies, which have been joined together, in their central part as seen from the side, by means of a transversal beam, upon which the driver's cab of the straddle carrier has been placed. It is thus understood that according to the invention the transversal beams at the front and rear ends of the side bodies have been omitted and replaced, in the manner described, by one transversal beam placed at the middle of the upper side bodies. When, furthermore, said transversal beam is dimensioned so as to operate in the manner of a torsion spring, simultaneous contact of all (traction) wheels even with an uneven driving surface is achieved. This last-mentioned advantage is not obtainable by the rigid body structure of prior art.

If the engine, which obstructs the vision, is replaced e.g. by two separate engines and these engines are placed below the upper side bodies on the support of special lower side bodies, together with their transmission equipment, the visibility can be further improved. The visibility may even further be improved by appropriate shaping of the upper side bodies' upper surface (oblique surfaces). In designs of prior art this means could not be utilized for improving the visibility without impairing the ratio of the straddle carrier's load space height and overall height.

The invention is described in detail with reference to one embodiment example of the invention presented in the figures of the attached drawing, but to which the invention is in no way confined.

The body of the straddle carrier comprises two mutually congruent upper side bodies 3, consisting of a box-type beam, mutually connected, at their central part as seen from the side, by a transversal beam 1 of box-type design. There is no other connecting part between the upper side bodies 3. To the central part of the transversal beam 1 the driver's cab 2 of the straddle carrier has been affixed, which is of the commonly known so-called double command type, with a set of pedals at both ends and with a revolving seat with steering wheel 6 following along with it.

Figure 3:
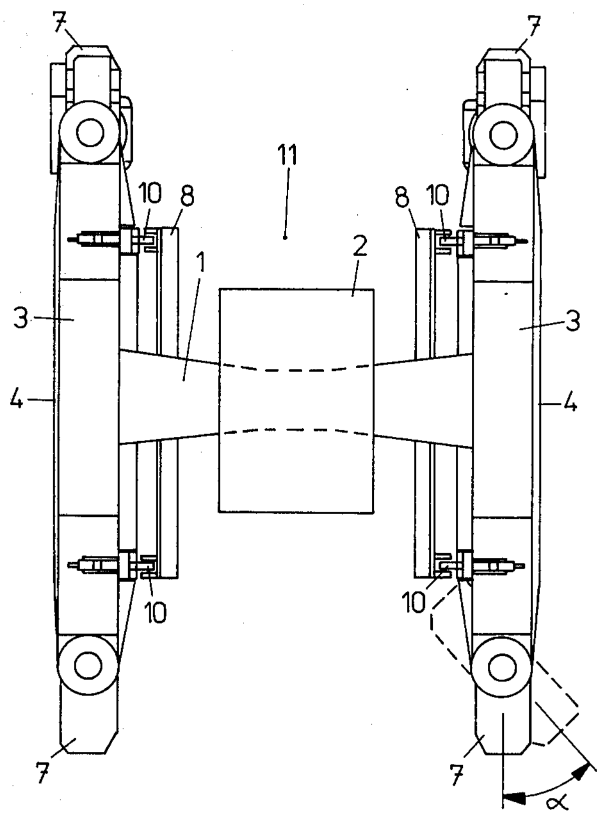
FIG. 3 shows the same, viewed from above.

Below the upper side bodies 3, lower side bodies 5 have been provided, which house the engines 4 of the straddle carrier with their transmissions. The body has at each corner a wheel 7 within its fork. All wheels 7 may either be traction wheels as well as steerable wheels, or the straddle carrier may have, for instance, two traction wheels and four steerable wheels 7. In the transmission, one may use commonly known, either hydrostatic or hydrodynamic, speed change means. In order to serve as an example, one wheel 7 has been shown in FIG. 3, by interrupted lines, in its turned end position, and the turning angle has been indicated by $\alpha$, this angle $\alpha$ being, for instance, about 40°.

The design of the lifting means for the load to be transported, generally indicated by the reference numeral 10, and of the combined lifting slides and gripping means 8 depends on the kind of the load to be transported; accordingly, the drawing only represents some such devices in a schematical manner. At all events, the lifting means derive their operating power from the engines 4.

The single engine employed in most of the previous constructions and placed on support of the side bodies and above them, with its transmissions, has been replaced by two separate engines 4, both of which have their own transmission gear. Both engines 4 have been placed on the side of the straddle carrier inside particular lower side bodies 5, which are located below the upper side bodies 3. The lower side bodies 5 have not been mutually connected by any particular beams. It follows that within the body structure of the straddle carrier and between the lifting means 10 there remains a free space 11 for the goods to be transported.

The design described in the foregoing is not merely advantageous as regards the driver's vision, but it is also simple in view of its manufacturing. The most essential variables in different straddle carriers include the height and width of the load space 11, which are dependent on the kind of the load, in the first place. The variability of said variables causes a great number of different body structure variants which have to be considered. In the design according to the invention, the lower side body 5 including the engine 4 and its transmission can be considered as a standard element, which is completely identical within a given capacity range of the straddle carrier. It is merely necessary to dimension the upper side bodies 3 and their transversal beam 1 in accordance with the desired height and width of the load space 11.

Figure 1:
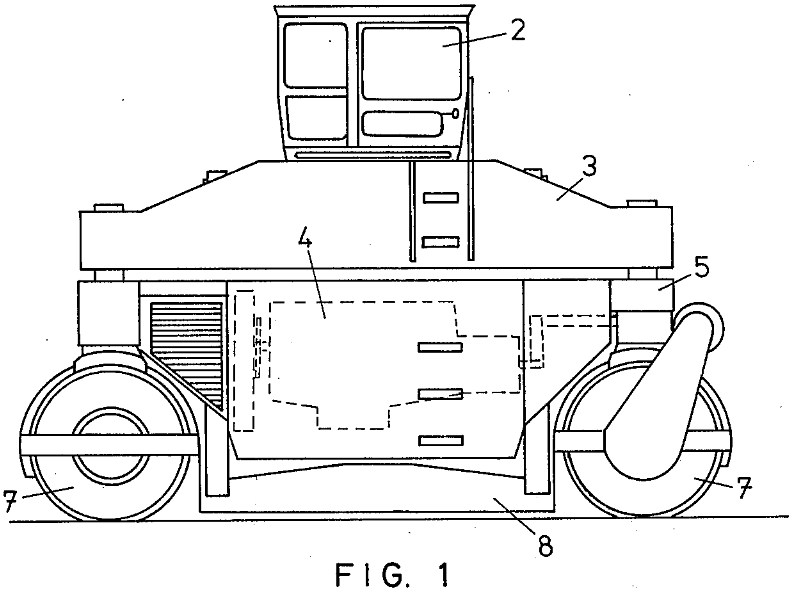
FIG. 1 shows the straddle carrier in elevational view.
Figure 2:
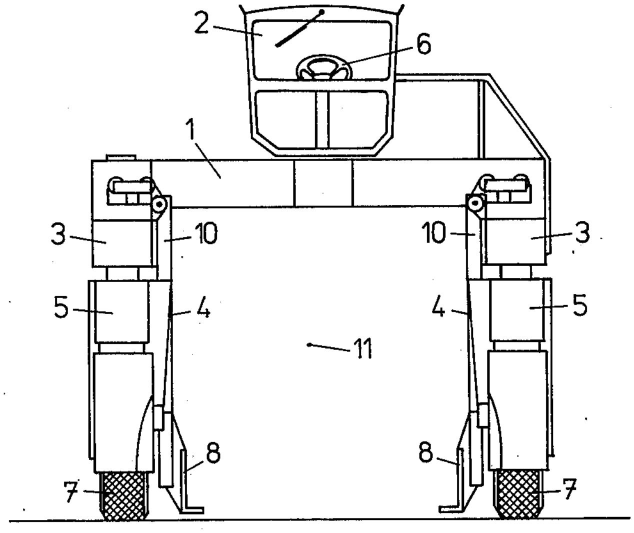
FIG. 2 shows the same, seen from one end and in the direction of travel of the straddle carrier.

According to FIG. 1, the visibility from the driver's cab 2 may be further improved by making the upper surfaces of the upper side bodies 3 such that they slope downwardly, as seen from the driver's cab 2.

Figure 4:
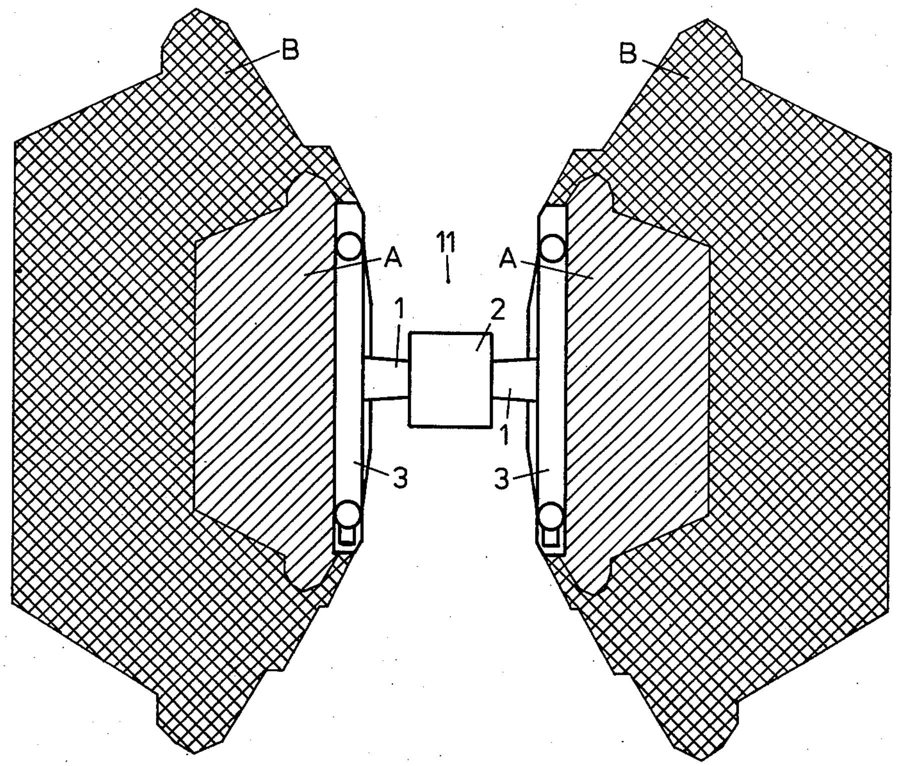
FIG. 4 illustrates the areas of visibility in connection with a straddle carrier according to the invention.

In FIG. 4 the driving visibility areas of a straddle carrier according to the invention can be seen. The hatched areas A and B represent the "blacked-out"

regions from the driver's point of view. As can be seen from FIG. 4, the forward and rearward driving visions in the direction of travel of the straddle carrier are both completely unobstructed. The slant-hatched area A represents the region in which an object of 170 cm height, such as a person moving about in the vicinity of the straddle carrier, is visible from the centre of the driver's cab 2, from the driver's eye level. The cross-hatched area B corresponds to the range of driving visibility, as on the level of an even driving surface.

I claim:

1. A straddle carrier comprising two spaced upper side bodies, the space between said bodies being used for the loads to be transported, a single transverse beam interconnecting said bodies and extending between opposed middle side portions of said bodies, a driver's cab carried by said beam, wheels and means connecting said wheels with said side bodies, said transverse beam being a box-type beam dimensioned to operate as a torsion spring, whereby simultaneous contact of all wheels with an uneven driving surface is achieved.

2. A straddle carrier according to claim 1, comprising lower side bodies located below said upper side bodies, and separate engines carried by said lower side bodies and located below said upper side bodies.

3. A straddle carrier according to claim 1, wherein said upper side bodies have upper opposed surfaces which extend obliquely downwardly from the driver's cab for an enlarged field of vision of the driver.

* * * * *